United States Patent
Wang et al.

(10) Patent No.: US 8,083,148 B2
(45) Date of Patent: Dec. 27, 2011

(54) INDICIA READING TERMINAL INCLUDING FRAME PROCESSING

(75) Inventors: Ynjiun P. Wang, Cupertino, CA (US);
Kevin D. Bower, Syracuse, NY (US);
Edward C. Bremer, Victor, NY (US);
Robert M. Hussey, Camillus, NY (US);
Matthew W. Pankow, Camillus, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 366 days.

(21) Appl. No.: 12/335,777

(22) Filed: Dec. 16, 2008

(65) Prior Publication Data

US 2010/0147956 A1    Jun. 17, 2010

(51) Int. Cl.
*G06K 7/10* (2006.01)
(52) U.S. Cl. ............... 235/472.01; 235/462.46
(58) Field of Classification Search ......... 235/472.01, 235/462.45, 375, 462.46, 462.16
See application file for complete search history.

(56) References Cited

U.S. PATENT DOCUMENTS

| | | | |
|---|---|---|---|
| 5,262,871 A | 11/1993 | Wilder et al. | |
| 5,308,966 A | 5/1994 | Danielson et al. | |
| 5,378,883 A | 1/1995 | Batterman et al. | |
| 5,461,491 A | 10/1995 | Degi | |
| 5,572,006 A | 11/1996 | Wang et al. | |
| 5,576,529 A | 11/1996 | Koenck et al. | |
| 5,600,121 A | 2/1997 | Kahn et al. | |
| 5,640,001 A | 6/1997 | Danielson et al. | |
| 5,811,828 A | 9/1998 | Laser | |
| 5,814,803 A | 9/1998 | Olmstead et al. | |
| 5,841,121 A | 11/1998 | Koenck | |
| 6,123,264 A | 9/2000 | Li et al. | |
| 6,213,399 B1 | 4/2001 | Tsi et al. | |
| 6,250,551 B1 | 6/2001 | He et al. | |
| 6,431,452 B2 | 8/2002 | Feng | |
| 6,598,797 B2 | 7/2003 | Lee | |
| 6,794,627 B2 | 9/2004 | Lyon et al. | |
| 6,860,428 B1 | 3/2005 | Dowling et al. | |
| 6,918,538 B2 | 7/2005 | Breytman et al. | |

(Continued)

FOREIGN PATENT DOCUMENTS

JP    2002243918 A    8/2002

OTHER PUBLICATIONS

European Patent Office, Abstract, European Patent Application No. 09178777.0, (1 page).

(Continued)

*Primary Examiner* — Edwyn Labaze
(74) *Attorney, Agent, or Firm* — Heslin Rothenberg Farley & Mesiti P.C.

(57) ABSTRACT

There is described an indicia reading terminal that can be operative to process a frame of image data for attempting to decode a decodable indicia. A frame can be a frame that is among a succession of frames for subjecting to processing subsequent to and during a time a trigger signal is active. Such a succession of frames can include zero or more binned frames, zero or more unbinned frames, zero or more windowed frames, and zero or more unwindowed full frames. An indicia reading terminal can also include a variable focus imaging lens. Control of the variable focus imaging lens can be provided so that during an exposure period for a binned frame the variable focus imaging lens is set to a short range focus setting and further so that during an exposure period for a windowed frame the variable focus imaging lens is set to a long range focus setting.

25 Claims, 6 Drawing Sheets

U.S. PATENT DOCUMENTS

| | | |
|---|---|---|
| 6,981,642 B2 | 1/2006 | Krichever |
| 6,991,168 B2 | 1/2006 | Tsi et al. |
| 2002/0039137 A1 | 4/2002 | Harper et al. |
| 2003/0226895 A1 | 12/2003 | Havens et al. |
| 2005/0041881 A1 | 2/2005 | Recht |
| 2005/0116041 A1 | 6/2005 | Zhu et al. |
| 2005/0218231 A1 | 10/2005 | Massieu |
| 2006/0011724 A1 | 1/2006 | Joseph et al. |
| 2006/0202038 A1 | 9/2006 | Wang et al. |
| 2007/0080280 A1 | 4/2007 | Havens |
| 2007/0102520 A1 | 5/2007 | Carlson et al. |
| 2007/0164115 A1* | 7/2007 | Joseph et al. ............ 235/462.21 |

OTHER PUBLICATIONS

European Patent Office, Communication pursuant to Article 94(3) EPC, European Patent Application No. 09178777.0, dated Jan. 10, 2011, (6 pages).

European Patent Office, European Search Report, European Patent Application No. 09178777.0, dated Jul. 1, 2010, (3 pages).

Japanese Patent Application and English Translation, Japanese Patent Application No. 2002-243918, Publication date, Aug. 28, 2008 (48 pages).

* cited by examiner

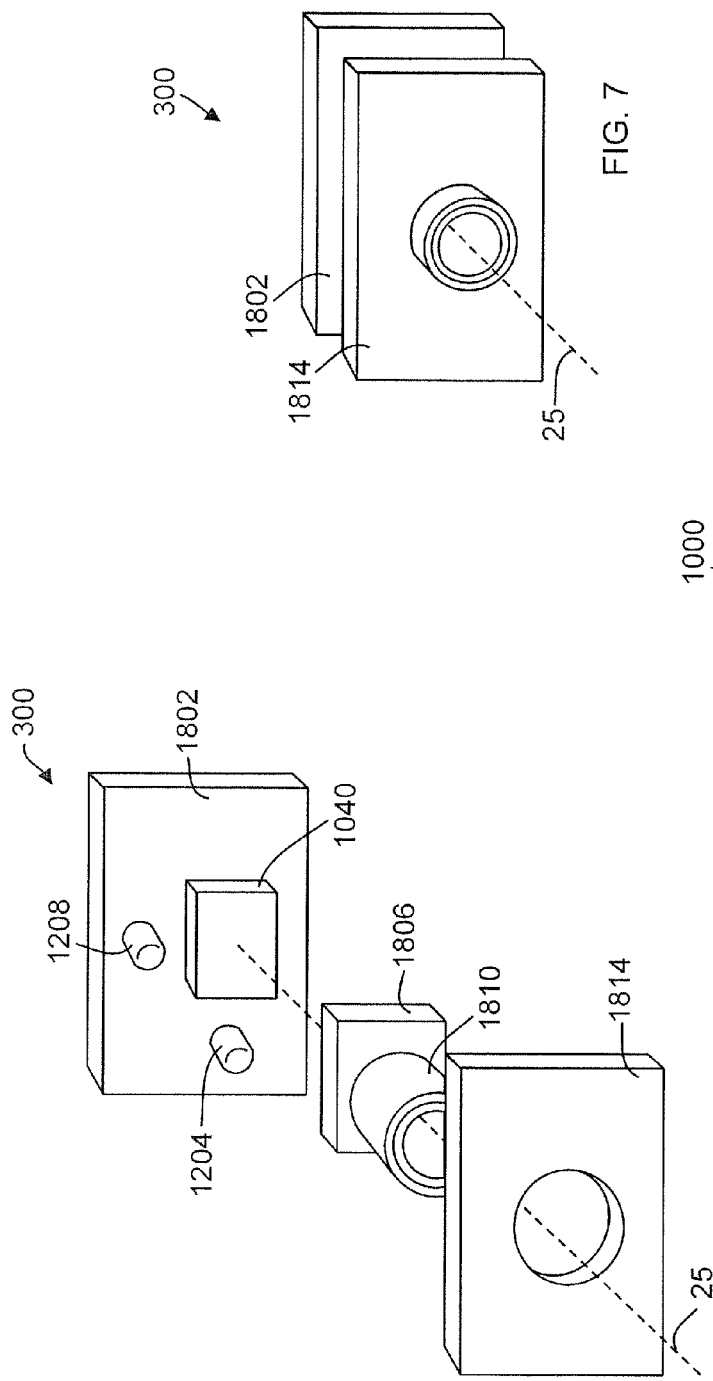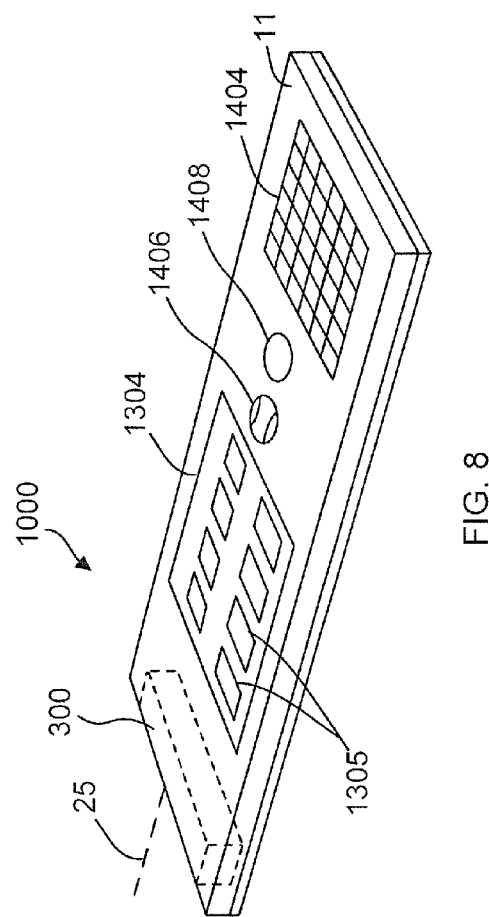

INDICIA READING TERMINAL INCLUDING FRAME PROCESSING

FIELD OF THE INVENTION

The present invention relates to registers in general and in particular to an optical based register.

BACKGROUND OF THE INVENTION

Indicia reading terminals are available in multiple varieties. The well known gun style reader as commonly seen at retail store checkout counters is typically available in a form devoid of a keyboard and display. Enhanced functioning indicia reading terminals having keyboards displays and advanced networking communication capabilities are also available. Typically, indicia reading terminals have triggers for activating decoding attempts.

Manufacturers of indicia reading terminals have incorporated image sensor arrays having increased resolution (as measured in terms of numbers of pixels) into their indicia reading terminals. However, performance and cost disadvantages are introduced as a number of pixels of an image sensor array is increased. As pixel size becomes smaller, a yielded signal to noise ratio (SNR) becomes lower potentially impacting decode performance as well as hand motion tolerance. Also, as a number of pixels increases, memory bandwidth overhead increases.

SUMMARY OF THE INVENTION

There is described an indicia reading terminal that can be operative to process a frame of image data for attempting to decode a decodable indicia. A frame can be a frame that is among a succession of frames for subjecting to processing subsequent to and during a time a trigger signal is active. Such a succession of frames can include zero or more binned frames, zero or more unbinned frames, zero or more windowed frames, and zero or more unwindowed full frames. An indicia reading terminal can also include a variable focus imaging lens. Control of the variable focus imaging lens can be provided so that during an exposure period for a binned frame the variable focus imaging lens is set to a short range focus setting and further so that during an exposure period for a windowed frame the variable focus imaging lens is set to a long range focus setting.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 6 is an exploded perspective view of an imaging module carrying a subset of circuits as shown in FIG. 3;

FIG. 7 is an assembled perspective view of the imaging module as shown in FIG. 6;

FIG. 8 is a perspective view of a hand held indicia reading terminal incorporating an imaging module as shown in FIGS. 6 and 7;

DETAILED DESCRIPTION OF THE INVENTION

Figure 1:
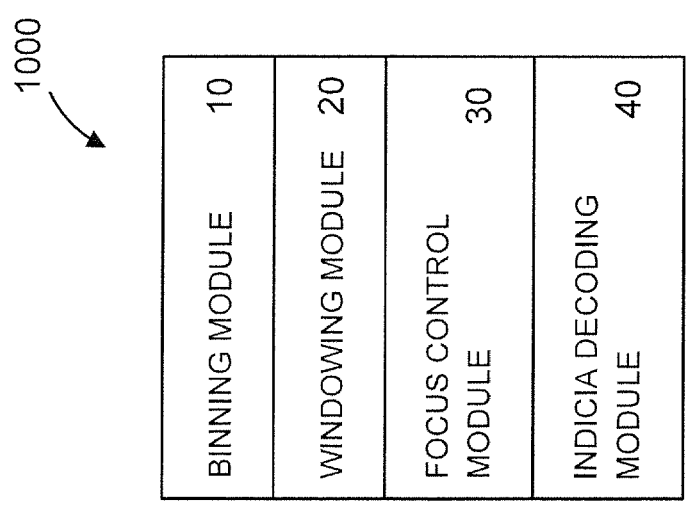
FIG. 1 is a functional block diagram illustrating an embodiment of an indicia reading terminal.

A functional block diagram including an embodiment of indicia reading terminal 1000 is shown in FIG. 1. Terminal 1000 can include one or more of a binning module 10 for binning a frame of image data and for providing a binned frame of image data, a windowing module 20 for providing a windowed frame of image data, a focus control module 30 for setting a focus of a variable focus imaging lens of terminal 1000, and an indicia decoding module 40 for attempting to decode a frame of image data.

Figure 2:
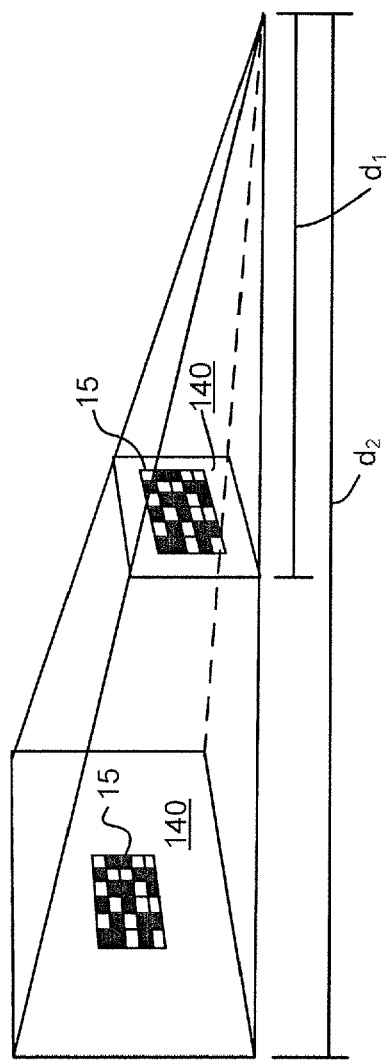
FIG. 2 is a diagram illustrating field of view size of an exemplary indicia reading terminal wherein a field of view encompasses a larger area of a target substrate at longer range terminal to target distances, and where a pixel/mil. (or pixel/inch) resolution of a representation of a same sized decodable indicia is lower at longer distances.

As shown in FIG. 2, a surface area encompassed by a field of view of an indicia reading terminal 1000 expands at longer reading distances. Thus at a relatively shorter terminal to target distance, $d_1$, a decodable indicia 15 of a given physical size area will consume a larger portion of a field of view 140 as compared to field of view 140 at a relatively longer terminal to target distance, $d_2$. In one embodiment, terminal 1000 is operative to process one or more of binned frames of image data and to capture windowed frames of image data. Binned frames are particularly advantageous for use in decoding of decodable indicia at shorter range terminal to target distances. At relatively shorter terminal to target distances, pixel resolution is less significant a factor in determining decoding speed or likelihood of decoding; accordingly, binning allows for an increased signal to noise ratio, while allowing frame capture at a resolution sufficient for purposes of decoding. Also, as binned frames comprise a smaller number of pixel positions than unbinned frames representing the same area in physical space, binned frames reduce memory bandwidth overhead. Use of windowed frames is particularly useful for decoding of frames of image data at longer terminal to target distances. Windowed frames can be captured more rapidly than standard size frames. As frames captured at longer terminal to target distances can be expected to have a large amount of extraneous image data not representing a decodable indicia outside the area of the windowed frame, windowing at longer terminal to target distances can reduce image capture time without reducing a likelihood of a successful decode. Also, as windowed frames include fewer pixel values than full frames, windowed frames reduce memory bandwidth overhead.

Figure 3:
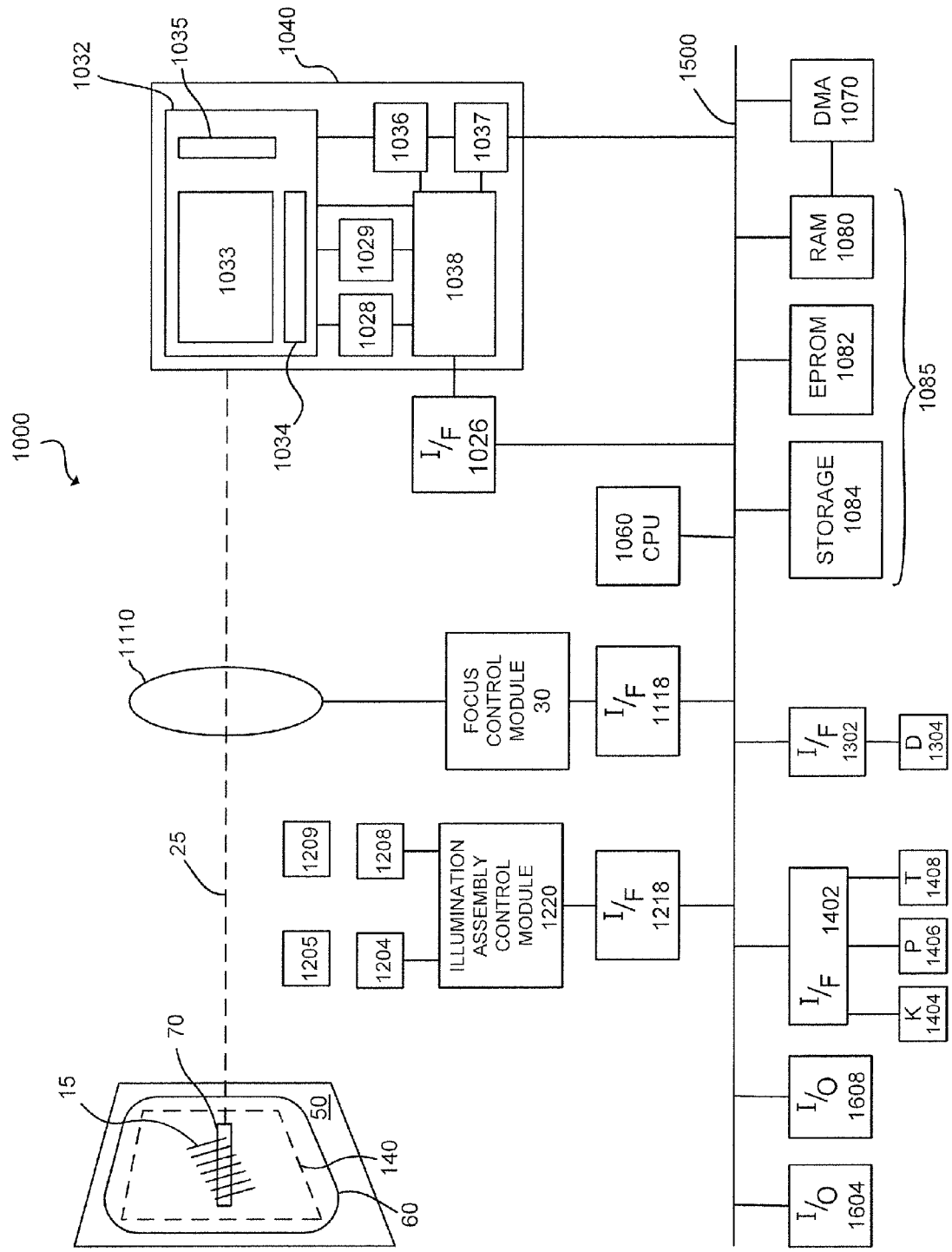
FIG. 3 is a block diagram illustrating an exemplary hardware platform for executing a method described herein.

An exemplary hardware platform for carrying out the described method is shown and described with reference to the block diagram of FIG. 3. Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier circuitry 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can be provided by a Micron MT9PO31 image sensor having a 2592×1944 pixel image sensor array. In one embodiment, image sensor integrated circuit 1040 can incorporate a Bayer pattern filter. In such an embodiment, CPU 1060 prior to subjecting a frame to further processing can interpolate pixel values intermediate of green pixel values for development of a monochrome frame of image data. Also, for development of a monochrome frame of image data, binning module 10 can be activated for processing color image information of a color frame of image data.

In the course of operation of terminal 1000 image signals can be read out of image sensor 1032, converted and stored into a system memory such as RAM 1080. Image data stored in RAM 1080 can be in the form of multibit pixel values, with each multibit pixel value representing light incident on a pixel of image sensor array 1033. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion and storage to RAM 1080. In another embodiment, terminal 1000 can employ a system bus providing for bus arbitration mechanism (e.g., a PCI bus) thus eliminating the need for a central DMA controller. Other embodiments of the system bus architecture and/or direct memory access components providing for efficient data transfer between the image sensor 1032 and RAM 1080 can be provided.

Referring to further aspects of terminal 1000, terminal 1000 can include a variable focus imaging lens 1110 for use in focusing an image of a decodable indicia located within a field of view 140 on a substrate 50 onto image sensor array 1033. Imaging light rays can be transmitted about imaging axis 25. Variable focus imaging lens 1110 can be adapted to be capable of multiple best focus distances and multiple focal lengths. Variable focus imaging lens 1110 can be operative to provide a new best focus distance and/or focal length within a fraction of a frame time in response to an applied input control signal being applied to the variable focus imaging lens 1110. Variable focus imaging lens 1110 can be a deformable imaging lens, e.g., a deformable fluid lens or gel lens. Variable focus imaging lens 1110 can be a non-deformable fluid lens, e.g., an electrowetting liquid lens wherein the surface tension of one or more volumes of lens liquid changes in response to a signal being applied to the lens, or a liquid crystal type lens wherein indices of refraction of one or more volumes of lens fluid change in response to a signal being applied to the lens.

Terminal 1000 can also include an illumination pattern light source bank 1204 for use in generating an illumination pattern 60 substantially corresponding to a field of view 140 of terminal 1000 and an aiming pattern light source bank 1208 for use in generating an aiming pattern 70 on substrate 50. Shaping optics 1205 and 1209 can be provided for shaping light from bank 1204 and bank 1208 into pattern 60 and into pattern 70 respectively. In use, terminal 1000 can be oriented by an operator with respect to a substrate 50 bearing decodable indicia 15 in such manner that aiming pattern 70 is projected on a decodable indicia 15. In the example of FIG. 3, decodable indicia 15 is provided by a ID bar code symbol. Decodable indicia could also be provided by 2D bar code symbols or optical character recognition (OCR) characters. Each of illumination pattern light source bank 1204 and aiming pattern light source bank 1208 can include one or more light sources. Variable focus imaging lens 1110 can be controlled with use of focus control module 30 and the illumination assembly comprising illumination pattern light source bank 1204 and aiming pattern light source bank 1208 can be controlled with use of illumination assembly control module 1220. Focus control module 30 can send signals to variable focus imaging lens 1110 e.g., for changing a best focus distance and/or a focal length of variable focus imaging lens 1110. Illumination assembly control module 1220 can send signals to illumination pattern light source bank 1204 e.g., for changing a level of illumination output by illumination pattern light source bank 1204. In one example, terminal 1000 can be adapted so that illumination assembly control module 1220 controls light source bank 1204 to have a relatively lower level of illumination output when the best focus distance of imaging lens 1110 is set to a first shorter best focus distance, and a relatively higher level of illumination output when the best focus distance of imaging lens 1110 is set at a longer best focus distance. Such variable illumination settings can be varied within a time that trigger signal 502 remains active. The variable illumination level settings can be synchronized to the certain lens settings set forth in connection with the various configurations described with reference to Table A herein.

Terminal 1000 can also include a number of peripheral devices such as display 1304 for displaying such information as image frames captured with use of terminal 1000, keyboard 1404, pointing device 1406, and trigger 1408 which may be used to make active a trigger signal 502 for activating frame readout and/or certain decoding processes. Terminal 1000 can be adapted so that activation of trigger 1408 activates trigger signal 502 and initiates a decode attempt.

Terminal 1000 can include various interface circuits for coupling various of the peripheral devices to system address/data bus (system bus) 1500, for communication with CPU 1060 also coupled to system bus 1500. Terminal 1000 can include circuit 1026 for coupling image sensor timing and control circuit 1038 to system bus 1500, interface circuit 1118 for coupling focus control module 30 to system bus 1500, interface circuit 1218 for coupling illumination control assembly 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, terminal 1000 can include one or more I/O interfaces 1604, 1608 for providing communication with external devices (e.g., a cash register server, a store server, an inventory facility server, a peer terminal 1000, a local area network base station, a cellular base station). I/O interfaces 1604, 1608 can be interfaces of any combination of known computer interfaces, e.g., Ethernet (IEEE 802.3), USB, IEEE 802.11, Bluetooth, CDMA, GSM.

Figure 4:
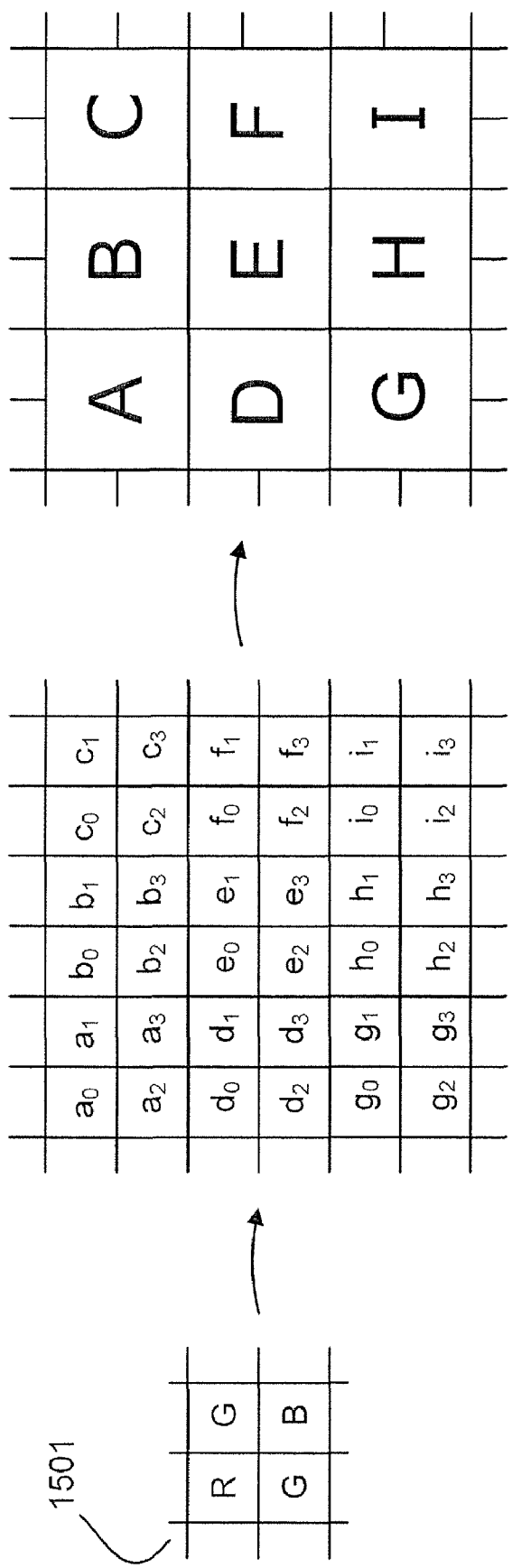
FIG. 4 is a diagram illustrating operations that can be performed by a binning module of an indicia reading terminal.

Aspects of binning module 10 and windowing module 20 in exemplary embodiments are now described. Binning module 10 can be activated to provide a binned frame of image data. An explanation of a binned frame is provided with reference to FIG. 4. In FIG. 4, grids are provided to represent pixel positions. Each of an image sensor array 1033 and a frame of image information which can be stored for capture of a frame of image data can be regarded to comprise a plurality of pixel positions, each position having an associated picture element image information value (sometimes referred to as a pixel value), expressed as a charge or voltage prior to memory storage and expressed as a bit or multibit data value after storage. For providing of a binned frame, image information values corresponding to multiple positionally adjacent pixel positions can be (a) summed (b) averaged subject to another applied function. A binned frame will have reduced resolution but higher brightness relative to an unbinned frame (if the binned frame is provided by summing) or a higher SNR relative to an unbinned frame (if the binned frame is provided by averaging). Referring to FIG. 4, there is shown a plurality of positionally adjacent pixel positions. For binning of a frame, image information values of a 2×2 block of pixel positions e.g., $a_0$, $a_1$, $a_2$, $a_3$ can be summed. For example, the image information values of pixel positions $a_0$, $a_1$, $a_2$, $a_3$ representing light incident on a 2×2 block of four positionally adjacent pixels can be summed to form an image information value corresponding to position A (where position A represents the same areas of a physical space as formerly represented by $a_0$, $a_1$, $a_2$, $a_3$), the image information values of pixel positions $b_0$, $b_1$, $b_2$, $b_3$ representing light incident on a 2×2 block of four positionally adjacent pixels can be summed to form an image information value corresponding to position B, and so on. In the described example, $A=a_0+a_1+a_2+a_3$; $B=b_0+b_1+b_2+b_3$; $C=c_0+c_1+c_2+c_3$; $D=d_0+d_1+d_2+d_3$; $E=e_0+e_1+e_2+e_3$; $F=f_0+f_1+f_2+f_3$; $G=g_0+g_1+g_2+g_3$; $H=h_0+h_1+h_2+h_3$; $I=i_0+i_1+i_2+i_3$. The binning process described can be repeated for all pixel positions of a frame. Binning module 10 in one embodiment can include analog binning circuit 1028 integrated into image sensor integrated circuit 1040. Analog binning circuit 1028 can sum charges corresponding to light incident on a set (e.g., a 2×2) block of pixels of image sensor 1032. For readout of a binned frame, the binned frame will have resolution reduced relative to an unbinned frame and will include image information values for a set of pixel positions, where each pixel position corresponds to a 2×2 block of pixels of image sensor array 1033, and each image information value will be a sum of charges of the pixels of each respective 2×2 block. Binning module 10 can also bin frames in the digital domain. For binning in the digital domain, a frame of image data is stored into memory, e.g., memory 1080. Then image information of the form of gray scale pixel values associated with pixel positions corresponding to a block e.g., a 2×2 block of positions can be summed. Where binning module 10 bins frames in the digital domain, pixel positions $a_0$, $a_1$, $a_2$, $a_3$, $b_0$, $b_1$ . . . are pixel positions of a frame of image data having gray scale pixel values, and pixel positions A, B, C, D, E, F, G, H, I are pixel positions of a resulting frame provided by binning of a full resolution frame.

Also, for binning of a frame, image information of a 2×2 block of pixel positions e.g., $a_0$, $a_1$, $a_2$, $a_3$ can be averaged. For example, the image information value of pixel positions $a_0$, $a_1$, $a_2$, $a_3$ representing light incident on a 2×2 block of four positionally adjacent pixels can be averaged to form a image information value corresponding to position A (where position A represents the same areas of a physical space as formerly represented by $a_0$, $a_1$, $a_2$, $a_3$), the image information of pixel positions $b_0$, $b_1$, $b_2$, $b_3$ representing light incident on a 2×2 block of four positionally adjacent pixels can be averaged to form an image information value corresponding to position B, and so on. In the described example, $A=(a_0+a_1+a_2+a_3)/4$; $B=(b_0+b_1+b_2+b_3)/4$; $C=(c_0+c_1+c_2+c_3)/4$; $D=(d_0+d_1+d_2+d_3)/4$; $E=(e_0+e_1+e_2+e_3)/4$; $F=(f_0+f_1+f_2+f_3)/4$; $G=(g_0+g_1+g_2+g_3)/4$; $H=(h_0+h_1+h_2+h_3)/4$; $I=(i_0+i_1+i_2+i_3)/4$. The binning process described can be repeated for all pixel positions of a frame. Binning module 10 in one embodiment can include analog binning circuit 1028 integrated into image sensor integrated circuit 1040. Analog binning circuit 1028 can average charges corresponding to light incident on a set (e.g., a 2×2) block of pixels of image sensor 1032. For readout of a binned frame, the binned frame will have resolution reduced relative to an unbinned frame and will include image information values for a set of pixel positions, where each pixel position corresponds to a 2×2 block of pixels of image sensor array 1033, and each image information value will be a sum of charges of the pixels of each respective 2×2 block. Binning module 10 can also bin frames in the digital domain. For binning in the digital domain, a full frame of image data is stored into memory, e.g., memory 1080. Then image information in the form of gray scale pixel values associated with pixel positions corresponding to a block e.g., a 2×2 block of positions can be averaged. Where binning module 10 bins frames in the digital domain, pixel positions $a_0$, $a_1$, $a_2$, $a_3$, $b_0$, $b_1$ . . . are pixel positions of a frame of image data having gray scale pixel values, and pixel positions A, B, C, D, E, F, G, H, I are pixel positions of a resulting frame provided by binning of a full resolution frame.

A binned frame that is provided by averaging image information associated with a block of pixel positions features a reduced noise level and therefore a higher SNR than an unbinned frame. A higher SNR provides a higher decode success rate. Also, a higher SNR permits successful decodes in environments of lower illumination.

Figure 5:
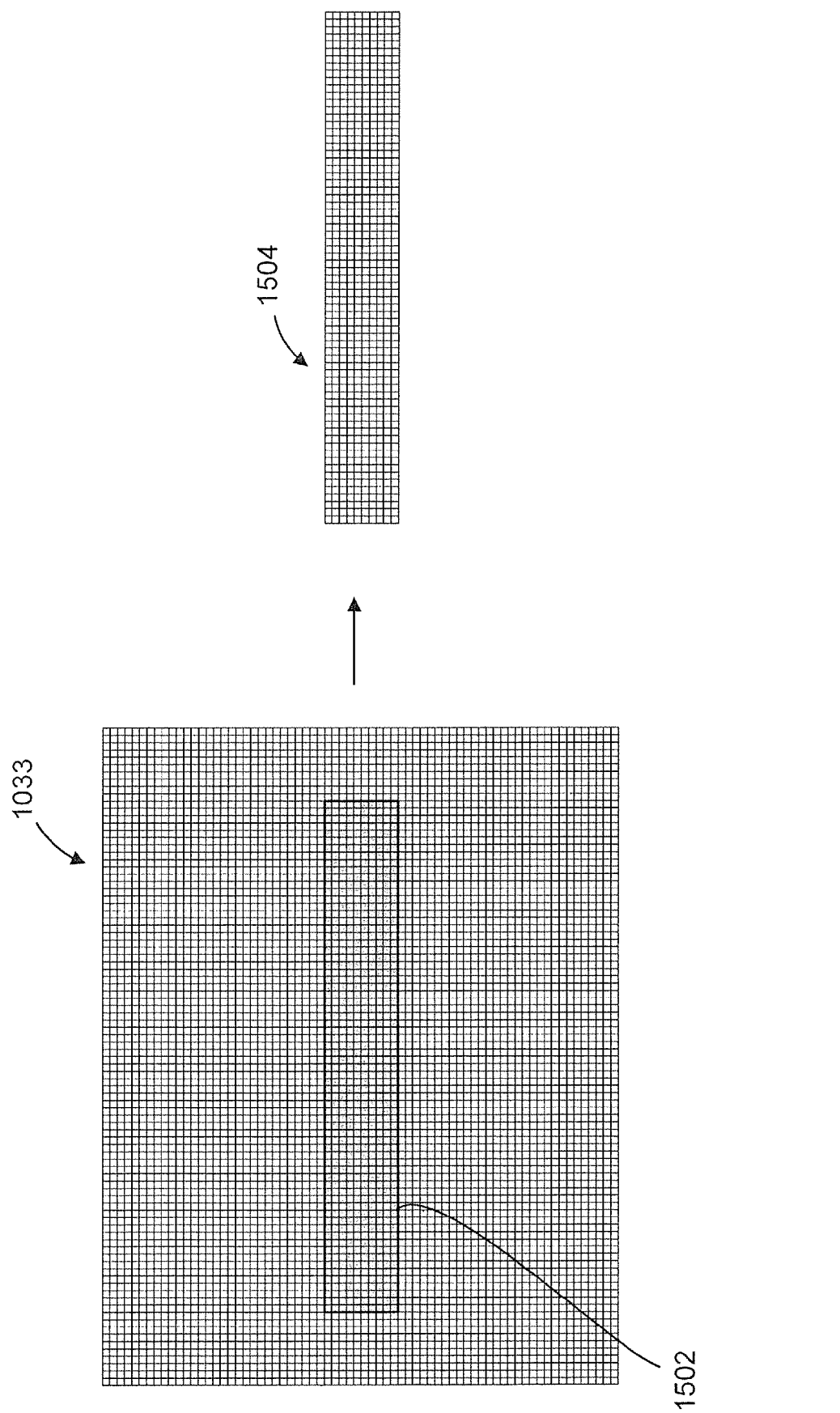
FIG. 5 is a diagram illustrating operations that can be performed by a windowing module of an indicia reading terminal.

Binning module 10 can be advantageously activated to convert a color frame to a monochrome frame. Where image sensor array 1033 includes a Bayer pattern filter, a filter having the characteristics of Bayer pattern filter segment 1501 will be disposed over image sensor array 1033. Without charges from the pixels being binned, an initial set of image information result of an image sensor array 1033 having a Bayer pattern filter will be color information including an image information value from the one of green, red, or blue light incident on each pixel of the array. With binning executed by binning circuit 1028, each resulting image information value will be a normalized monochrome image information value. Unlike alternative color to monochrome conversion systems binning module 10 when converting color image information to monochrome does not discard image information. Binning module 10 operative in the digital domain can also be activated for conversion of a color frame to a monochrome frame. In another embodiment, binning module 10 can be capable of binning image information values corresponding to pixel positions of various block sizes. With reference to FIG. 5, 2×2 block binning is described. Binning module 10 can also be capable of e.g., 4×4 binning. Binning module 10 can output a binned frame based on image information corresponding to a block of pixel positions using a function other than simple summing or averaging. For example, binning module 10 can provide color to gray level binning in such manner as to utilize white balance co-efficiencies to reduce the Moiré pattern effect. For example, binning module 10 can provide binning using the formula $A=cr*a_0+cg*(a_1+a_2)/2+cb*a_3$, where cr, cg, cb are white balance coefficients. Such coefficients can be obtained locally or globally by e.g., white patch or gray world algorithm.

A binned frame as is described in connection with FIG. 4 can be captured in less time than a full frame. The frame rate can increase when the size of the binning block is increased.

For example, where x is the frame rate for an unbinned frame, the expected frame rate for a binned frame with a 2×2 binning block can be expected to be about 2× and the expected frame rate for a binned frame with a 4×4 binning block can be expected to be about 4×.

Regarding windowing module 20, windowing module 20 can provide a windowed frame of image data. Windowing module 20 can include windowing circuit 1029 incorporated as part of image sensor integrated circuit 1040. In response to commands received from CPU 1060 via circuit 1026 and timing control circuit 1038, windowing circuit 1029 can selectively address for read out a subset of pixels of image sensor array 1033. A windowed frame is further described with reference to FIG. 5. Image sensor array 1033 can include a plurality of pixels arranged in a plurality of rows and columns of pixels as shown in FIG. 5. Terminal 1000 can be operated to read out a full frame of image data from image sensor array 1033. When reading out a full frame, terminal 1000 reads out image data corresponding to all or substantially all pixels of image sensor array 1033 (e.g., from 80% to 100% of image sensory array 1033). When reading out a windowed frame of image data, terminal 1000 reads out image information corresponding to a subset of pixels of image sensor array 1033. In one example of a reading out of a windowed frame, terminal 1000 reads out image information corresponding to less than 80% of pixels of image sensor array 1033. In another example of a reading out of a windowed frame, terminal 1000 reads out image information corresponding to less than 50% of pixels of image sensor array 1033. In another example of a reading out of windowed frame, terminal 1000 reads out image information corresponding to less than ⅓ of the pixels of image sensor array 1033. In another example of a reading out of windowed frame, terminal 1000 reads out image information corresponding to less than 25% of pixels of image sensor array 1033. In another example of a reading out of windowed frame, terminal 1000 reads out image data corresponding to less than 10% of pixels of image sensor array 1033.

A particular example of a windowed frame read out is described with reference to FIG. 5. A windowed frame can comprise a continuous group of positionally adjacent pixel positions. A continuous group of pixels can be provided where a group comprises each or essentially each pixel within a border defined by border pixels of a group. A group of pixels can also have a group of pixels including border pixels defining a border and skipped pixels within the border e.g., every other or every third pixel with the border can be skipped. Group of pixels 1502 in the example of FIG. 5 are pixels of image sensor array 1033 that are selectively addressed for read out of a windowed frame. The group of pixels 1502 in the example of FIG. 5 is shown as including a continuous group of K×L, K>5, L>5 array of positionally adjacent pixels selectively addressed from image sensor array 1033 having M×N pixels. A group of pixels for subjecting to read out of a windowed frame could also comprise a continuous group of K−1, L>5 array of pixels where the group of pixels are positionally adjacent such that each pixel position is positionally adjacent to at least one other pixel position of the group. Windowing circuit 1029 can be controlled to dynamically vary a window size between successive frames. It will be seen that a windowed frame at a certain terminal to target distance and lens setting can represent indicia within a defined area of a target substrate that is relatively smaller than a defined area within which indicia would be represented by a frame representing each pixel of image sensor array 1033.

When a windowed frame of image information is read out and stored in a memory in the form of digital image data, an image representation is provided having a number of pixel positions that is reduced relative to that of an image representation corresponding to a full frame. Windowed frame of image data 1504 as illustrated in FIG. 5 has a number of pixel positions corresponding to the number of pixels of group of pixels 1502 selectively addressed for read out of a windowed frame. It has been mentioned that image information read out from image sensor array 1033 can be amplified by amplifier circuitry 1036 and then subject to conversion by analog to digital converter 1037 and then subject to storage into RAM 1080. Stored image data stored into RAM 1080 can be in the form of multibit pixel values. Windowed frame 1504 when stored in memory 1085 where it can be addressed for processing by CPU 1060 can comprise a plurality of pixel positions corresponding to the K×L array of pixels subject to selective addressing and selective read out, and each pixel position can have associated therewith a multibit pixel value representing light incident at the pixel having the corresponding pixel position of image sensor array 1033.

Windowed frame 1504 can be captured in less time than a full frame. Accordingly, when terminal 1000 switches from capture of a full frame to a windowed frame, a frame rate can increase and a frame time can decrease. As the number of pixel positions is reduced relative to that of a full frame, a memory overhead bandwidth for storage of windowed frame 1504 can be reduced. Referring again to FIG. 5, it is seen that windowed frame 1504 can still be of sufficient size to include a complete representation of decodable indicia 15 where group of pixels 1502 is at a center of an image sensor array as shown in FIG. 5, where indicia 15 is centered at a full frame field of view of terminal 1000 and where indicia 15 is at a sufficient distance from terminal 1000. With aiming pattern generator comprising elements 1208, 1209 adapted to project aiming pattern 70 at a horizontally extending centerline of a field of view 140, terminal 1000 can easily be located so that a portion of a field of view corresponding to group of pixels 1502 is centered on indicia 15.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate can increase (and frame time decrease) where a captured frame is a binned frame or a windowed frame.

Referring to FIGS. 6 and 7, an imaging module 300 for supporting components of terminal 1000 can include image sensor integrated circuit 1040 disposed on a printed circuit board 1802 together with illumination pattern light source bank 1204 and aiming pattern light source bank 1208 each shown as being provided by a single light source. Imaging module 300 can also include containment 1806 for image sensor integrated circuit 1040, and housing 1810 for housing imaging lens 1110. Imaging module 300 can also include optical plate 1814 having optics for shaping light from bank 1204 and bank 1208 into predetermined patterns. Imaging module 300 can be disposed in a hand held housing 11, an example of which is shown in FIG. 8. Disposed on hand held housing 11 can be display 1304, trigger 1408, pointing device 1406, and keyboard 1404.

An example of an indicia reading terminal 1000 operating in accordance with described processing is described with reference to the timing diagram of FIG. 9. Referring to the timing diagram of FIG. 9, signal 502 is a trigger signal. Terminal 1000 can be operative so that trigger signal 502 is made active responsively to trigger 1408 being actuated and further so that trigger signal 502 remains active until the earlier of trigger 1408 being released or a predetermined number of a decodable indicia (e.g., 1) being successfully decoded and output. A decoded message corresponding to an encoded indicia that has been decoded can be output e.g., by storage of the message into a non-volatile memory, e.g., memory 1084 and/or display of the decoded message on display 1304 and/or transmitting the decoded message to an external CPU-equipped terminal e.g., a locally networked personal computer or a remote server. Exposure control signal 510 can be always active or else as in the embodiment shown in FIG. 9, terminal 1000 can be operative so that exposure control signal 510 is made active responsively to a trigger signal 502 being made active. During each exposure period e.g., period $e_0, e_1, e_2 \ldots$ pixels of image sensor array 1033 can be exposed to light focused on image sensor array 1033 by variable focus imaging lens 1110. Terminal 1000 can be operative so that after application of each exposure period $e_0, e_1, e_2 \ldots$ a readout control pulse can be applied to image sensor 1032 for readout of voltages corresponding to charges accumulated on pixels of image sensor array 1033 during the preceding exposure period. A readout control signal 512 can comprise a series of readout control pulses as indicated in the timing diagram of FIG. 9. Subsequent to a readout control pulse, image information in the form of voltages can be amplified by amplifier circuitry 1036, converted into digital format by analog to digital converter 1037, and the converted image data can be routed by DMA unit 1070 for storage into memory 1080 which can be addressable by CPU 1060. It is seen from the timing diagram of FIG. 9 that subsequent to activation of trigger signal 502 a succession of frames can be successively stored into memory 1080 where the frames are addressable for processing by CPU 1060. Terminal 1000 can be operative so that memory 1080 buffers a limited and predetermined number of frames successfully stored therein, and discards old frames after storage of a predetermined number of succeeding frames.

Referring to further aspects of an exemplary indicia reading terminal, time plot 514 illustrates focus adjustment periods of variable focus imaging lens 1110. It has been described that variable focus imaging lens 1110 can have multiple focus positions. In one example, variable focus imaging lens 1110 can have a shorter range focus position defining a plane of optical focus at first shorter terminal to target distance, a longer range focus position defining a plane of optical focus at a distance longer than the shorter range focus distance and can have an intermediate range focus distance being a focus distance between the shorter and the longer focus distance. In various embodiments, it can be advantageous to vary a focus distance of variable focus imaging lens 1110. In the example described with reference to the timing diagram of FIG. 9, a focus distance of variable focus imaging lens 1110 can be varied during a time that trigger signal 502 remains active. In an aspect illustrated with reference to FIG. 9, adjustment periods, e.g., periods $m_0, m_1, m_2 \ldots$ are coordinated with exposure periods of image sensor array 1033. With reference to the timing diagram of FIG. 9, adjustment periods $m_0, m_1, m_2 \ldots$ of variable focus imaging lens 1110 can be timed to coincide with periods that are intermediate of exposure periods e.g., $e_0, e_1, e_2 \ldots$ in such manner that exposure is avoided during times at which focus and possibly focal length characteristics of variable focus imaging lens 1110 are in a changing state. Frames exposed during an adjustment period can be expected to be blurred or otherwise disregarded. Accordingly, avoiding exposure during such periods can be advantageous. In the example of FIG. 9, variable focus imaging lens 1110 is subject to adjustment intermediate every exposure period during an activation period of trigger signal 502. However, it is understood that a focus position and a fixed length of variable focus imaging lens 1110 can remain constant through a succession of exposure periods. Variable focus imaging lens 1110 can be selected to be of a type in which focus position and focal length can be changed within a short time period, e.g., less than 10 ms. Where variable focus imaging lens 1110 is a deformable lens, adjustment of optical properties of the lens (e.g. focal length and therefore focal distance) can result from force being applied to the surface of the lens to change a concavity thereof. Where variable focus imaging lens 1110 is a liquid crystal lens, an adjustment of variable focus imaging lens 1110 can result from applying an electrical signal to variable focus imaging lens 1110 to change indices of refraction of the lens and therefore the focal length and focal distance of the lens.

Figure 9:
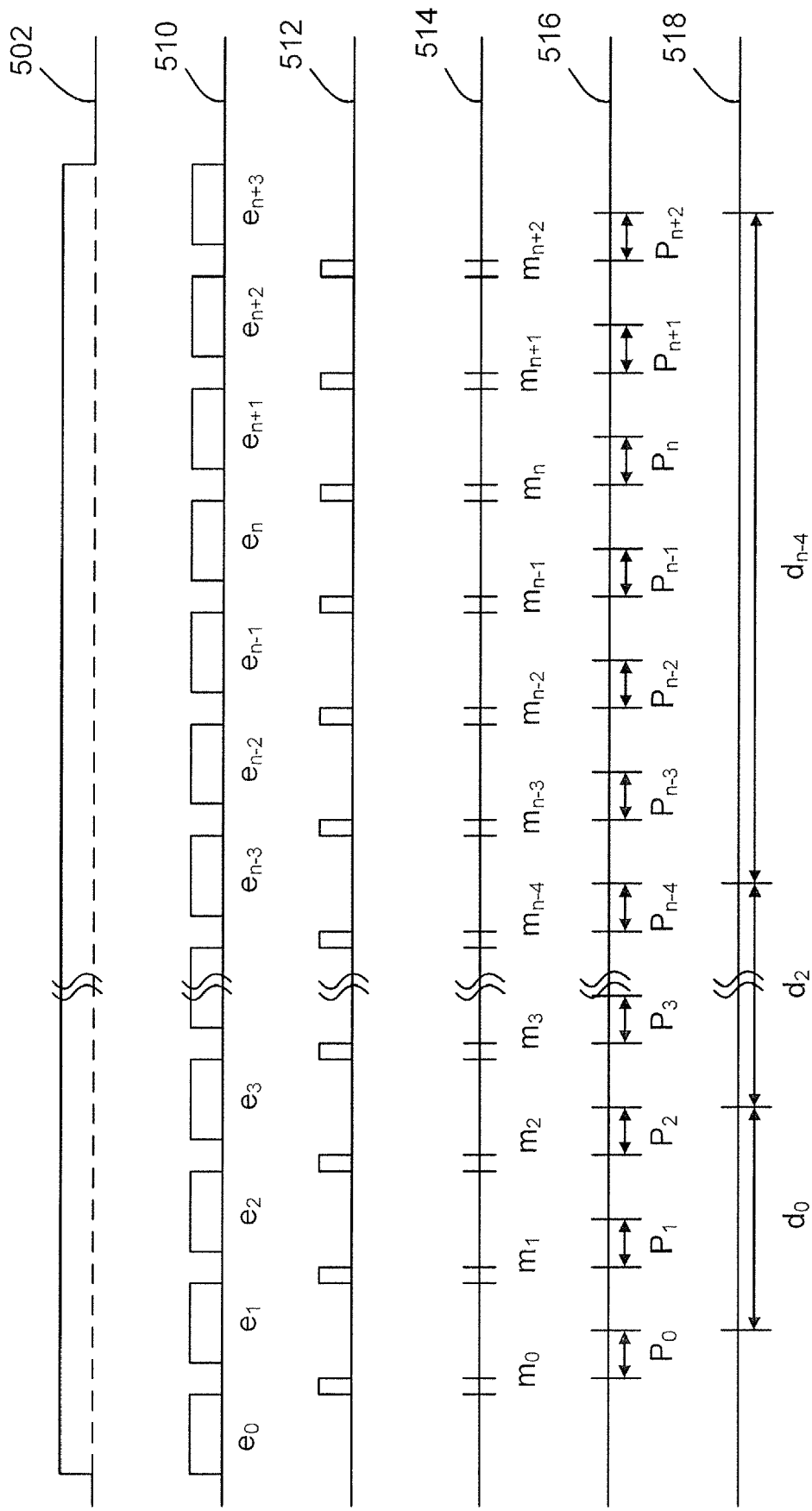
FIG. 9 is a timing diagram illustrating a timing of various operations that can be carried out by an indicia reading terminal.

Referring to the time plots 516 and 518 of the timing diagram of FIG. 9, CPU 1060 can subject each frame of a succession of frames to preliminary processing and can subject a subset of the succession of frames to decoding processing for attempting to decode a frame of image data. Time plot 516 illustrates times for preliminary processing of frames for CPU 1060.

During preliminary processing periods $p_0, p_1, p_2 \ldots$ CPU 1060 can preliminarily evaluate each frame of a succession of frames. Such preliminary processing can include e.g., detecting a quality of a frame based on average white level or a quality of a frame based on another criteria, incidence in sharpness of edges. Based on the result of the preliminary processing a subset of frames of a succession of frames can be subject to decoding processing for attempting to decode a decodable indicia represented in a frame. In the particular example of the timing diagram of FIG. 9, CPU 1060 can subject an initial frame, frame=$frame_0$ to decoding processing for period $d_0$, can switch to decoding processing of frame=$frame_2$ during period $d_2$, and can switch to decoding processing of frame=$frame_4$ during period $d_4$. In the timing diagram of FIG. 9, the subscript indicates the frame number, e.g., exposure period $e_{n-1}$ indicates the exposure period for frame=frame $e_{n-1}$, processing period $p_1$ indicates a preliminary processing for frame=$frame_1$ of a succession of frames, and decoding period, $d_2$, indicates a decoding processing period for frame=$frame_2$ and so on. Terminal 1000 can be operative so that preliminary processing periods $p_0, p_1, p_2 \ldots$ are restricted from consuming more than a predetermined time period, e.g., more than a predetermined fraction of time. In one embodiment, preliminary processing periods $p_0, p_1, p_2 \ldots$ can be restricted from consuming a time period of more than one half of a frame time, i.e., more than 8.3 ms where a frame time is 16.6 ms.

Regarding binning module 10, it has been mentioned that binning module 10 can bin frames of image data either in the analog domain by activation of binning circuit 1028, or in the digital domain, e.g., by CPU 1060 by way of processing of a stored frame. Where operative to bin frames in the digital domain by processing of a frame of image data stored in memory 1085, CPU 1060 can be operative to provide a binned frame either as part of a preliminary processing of a frame during a period such as period $p_0, p_1, p_2 \ldots$ or as part of a decoding process such as during period $d_0, d_1, d_2 \ldots$.

Referring to FIG. 1, one or more of binning module 10, windowing module 20 and focus control module 30 can be controlled in a coordinated manner for enhanced performance of terminal 1000.

Various possible configurations of terminal 1000 are described with reference to Table A. Terminal 1000 can be operative so that any one of the listed configurations can be made active by operator selection of a displayed button 1305 corresponding to the configuration. Terminal 1000 can be operative to display one button 1305 corresponding to each possible configuration. Table A describes aspects of frames subject to processing during a time that trigger signal 502 remains active according to each of several different configurations.

TABLE A

| CONFIGURATION | FRAMES | | | | | |
|---|---|---|---|---|---|---|
| | $Frame_0$ | $Frame_1$ | $Frame_2$ | $Frame_3$ | $FRAME_4$ | $FRAME_5$ |
| A | Focus Intermediate Frame Type Normal | Focus Intermediate Frame Type Normal | Focus Intermediate Frame Type Normal | Focus Intermediate Frame Type Normal | Focus Intermediate Frame Type Normal | Focus Intermediate Frame Type Normal |
| B | Focus Intermediate Frame Type Normal | Focus Intermediate Frame Type Normal | Focus Intermediate Frame Type Normal | Focus Intermediate Frame Type Normal | Focus Intermediate Frame Type Normal | Focus Intermediate Frame Type Normal |
| C | Focus Intermediate Frame Type Normal | Focus Intermediate Frame Type Normal | Focus Intermediate Frame Type Normal | Focus Intermediate Frame Type Normal | Focus Intermediate Frame Type Normal | Focus Longer Frame Type Windowed |
| D | Focus Intermediate Frame Type Normal | Focus Shorter Frame Type Binned | Focus Intermediate Frame Type Normal | Focus Longer Frame Type Windowed | Focus Intermediate Frame Type Normal | Focus Shorter Frame Type Binned |
| E | Focus Shorter Frame Type Binned | Focus Longer Frame Type Windowed | Focus Shorter Frame Type Binned | Focus Longer Frame Type Windowed | Focus Shorter Frame Type Binned | Focus Longer Frame Type Windowed |
| F | Focus Shorter Frame Type Binned | Focus Shorter Frame Type Binned | Focus Shorter Frame Type Binned | Focus Longer Frame Type Windowed | Focus Longer Frame Type Windowed | Focus Longer Frame Type Windowed |
| G | Focus Longer Frame Type Normal | Focus Longer Frame Type Normal | Focus Longer Frame Type Normal | | | |
| H | Focus Shorter Frame Type Binned | Focus Shorter Frame Type Binned | Focus Shorter Frame Type Binned | Focus Shorter Frame Type Binned | Focus Shorter Frame Type Binned | Focus Shorter Frame Type Binned |
| I | Focus Even Shorter Frame Type 4 × 4 Binned | Focus Shorter Frame Type 2 × 2 Binned | Focus Intermediate Frame Type Normal | Focus Longer Frame Type 2592 × 512 Window | Focus Even Longer Frame Type 1000 × 200 Window | Focus Longer Frame Type 2592 × 512 Window |

| CONFIGURATION | FRAMES | | | | |
|---|---|---|---|---|---|
| | $Frame_6$ | $Frame_7$ | $Frame_8$ | $Frame_9$ | ... |
| A | Focus Intermediate Frame Type Binned | Focus Intermediate Frame Type Binned | Focus Intermediate Frame Type Binned | Focus Intermediate Frame Type Binned | ... |
| B | Focus Intermediate Frame Type Normal | Focus Shorter Frame Type Binned | Focus Shorter Frame Type Binned | Focus Shorter Frame Type Binned | ... |
| C | Focus Longer Frame Type Windowed | Focus Longer Frame Type Windowed | Focus Longer Frame Type Windowed | Focus Longer Frame Type Windowed | ... |
| D | Focus Intermediate Frame Type Normal | Focus Longer Frame Type Windowed | Focus Intermediate Frame Type Normal | Focus Shorter Frame Type Binned | ... |
| E | Focus Shorter Frame Type Binned | Focus Longer Frame Type Windowed | Focus Shorter Frame Type Binned | Focus Longer Frame Type Windowed | ... |
| F | Focus Shorter Frame Type Binned | Focus Shorter Frame Type Binned | Focus Shorter Frame Type Binned | Focus Longer Frame Type Windowed | ... |
| G | | | | | |
| H | Focus Shorter Frame Type Binned | Focus Shorter Frame Type Binned | Focus Shorter Frame Type Binned | Focus Shorter Frame Type Binned | ... |

TABLE A-continued

| | | | | |
|---|---|---|---|---|
| I | Focus Intermediate | Focus Shorter | Focus Even Shorter | Focus Shorter |
| | Frame Type Normal | Frame Type 2 × 2 Binned | Frame Type 4 × 4 Binned | Frame Type 2 × 2 Binned |

When configuration A is active, terminal 1000 is operative to capture and process a succession of normal frames until a predetermined condition is satisfied, and then switch to processing of one or more binned frames. The term "normal frame" in reference to Table A refers to a frame that is neither binned nor windowed. A binned frame which may be provided by way of analog or digital binning is explained herein. The predetermined condition can be e.g., a time out condition (e.g., decoding not being successful for a predetermined time from a time of trigger signal actuation). The predetermined condition can also be e.g., a sensed terminal to target distance or that the quality of a frame satisfies a predetermined criteria as measured by e.g., the summation of absolute values of the first derivative of a set of sample values at selected sampling areas of a frame. Terminal 1000 can be operative to sense a terminal to target distance utilizing an average white level of a frame of image data. Terminal 1000 can determine that the terminal is at a relatively shorter terminal to target distance when an average white level of a frame is above a predetermined threshold. The focus setting when configuration A is active does not change from frame to frame. Thus terminal 1000 can be operative in accordance with configuration A, even where imaging lens 1110 is not a variable focus lens but a fixed lens provided by a fixed focus imaging lens, devoid of a capacity to vary its defined focus distance or focal length. A binned frame can be captured at higher speeds than an unbinned frame. Hence, selection of configuration A and all configurations described herein featuring binned frames can speed up decoding operations.

Regarding configuration B, configuration B is like configuration A, except that in accordance with configuration B a switch to processing of a binned frame is timed with a certain focus setting of variable focus imaging lens 1110. In configuration B, binning of frames can be conditionally carried out in response to satisfaction of one of the predetermined criteria as explained in connection with configuration A. However, in accordance with configuration A, a change in focus setting can result from a predetermined criteria being satisfied. In configuration B, terminal 1000 can be operative so that during an exposure period of a binned frame (which can be binned before or after being subject to storage) the variable focus imaging lens 1110 is set to a shorter focus setting. Thus, in the case the target indicia is in fact disposed at the shorter focus distance, the likelihood of a successful decode will increase first by the sharp focus of a resulting frame and second by a higher SNR brought about by the binning of the frame, where binning is provided by averaging imaging information values associated with a block of pixel positions.

When in configuration C, terminal 1000 in response to a trigger signal 502 being made active, can capture and process a plurality of normal frames and then switch during the activation period of signal 502 to capture windowed frames in response to a predetermined criteria. As noted, the windowed frames can be captured at higher speed; hence selection of configuration C and all configurations described herein featuring windowed frames speeds up decoding operations. The predetermined criteria can be e.g., that decoding is not successful within a predetermined time within the time period of trigger signal activation or that the terminal is at a relatively longer distance from a target (which can be indicated e.g., by an average white level of a prior frame being below a predetermined threshold) or that the quality of a frame satisfies a predetermined criteria as measured by e.g., the summation of absolute values of the first derivative of a set of sample values at selected sampling areas of a frame.

In configuration D, both the focus of variable focus imaging lens 1110 and the type of frame (binned, normal, windowed) switch between successive frames. The binning of frames can be synchronized to the setting of the variable focus imaging lens at a shorter focus setting (terminal 1000 can be controlled so that during an exposure period of a binned frame the imaging lens is set to a shorter focus setting). The capture of normal unbinned full frames can be synchronized to an intermediate focus setting (terminal 1000 can be controlled so that during an exposure period of a normal frame, the variable focus imaging lens is set to an intermediate focus setting). The capture of windowed frames can be synchronized with the setting of a variable focus imaging lens 1110 at a longer range focus setting (terminal 1000 can be controlled so that during an exposure period of a windowed frame the image lens is set to a longer focus setting).

Referring to operation in accordance with configuration E, operation in accordance with configuration E active is like operation with configuration D active except the frame characteristics switch between binned and windowed frames with no normal (unbinned, unwindowed) frames being captured. Accordingly, each frame captured with trigger signal 502 and configuration E active can be captured at a faster frame time relative to that of an unbinned frame and can have reduced memory overhead bandwidth relative to that of a normal frame.

In the embodiment of configurations D and E, the switching between binned, normal (configuration D), and windowed frames, each synchronized with a setting of variable focus imaging lens 1110 at a certain lens setting for each frame type, can be made according to an open loop operation, where the switching is made without the switching being conditional on a predetermined condition being satisfied (e.g., a terminal to target distance, an elapsed decode type). However, in a variation of configurations D and E, terminal 1000 is operative so that the switching between frame types (each synchronized with a specific lens setting) is conditional on a predetermined condition being satisfied (e.g., an elapsed decode time threshold being satisfied or a predetermined terminal to target distance being satisfied).

Referring to configuration F, the operation of terminal 1000 in accordance with configuration F is similar to its operation in accordance with configuration E, except that the focus setting and frame type do not switch for each successive frame. Instead, the focus setting and frame type (binned, windowed) remain constant for a predetermined number (3 in the described example) and then switch to a new focus setting and frame time. In configuration F, like configuration E, each frame is either a binned frame or a windowed frame. Accordingly, each frame captured with configuration F active can be captured with a faster frame time than a frame time of an unbinned full frame. The windowed frames in the examples of configurations C, D, E, and F can be windowed frames having image data corresponding to (representing light incident at) a continuous group of pixels of sufficient size so that image data of the windowed frames can represent a complete decoded indicia (but since decoding as will be described can be accomplished by associating code words for certain symbols given, need not represent a complete indicia for decoding to be successful). In one example, the windowed frames can be image data representing light incident at a continuous 2592×512 group of pixels centered at a center of image sensor 1032 when image sensor 1032 has 2592×1944 total pixels.

Regarding configurations G and H, configurations G and H can be advantageous to activate in many use cases including the use case that image sensor array 1033 has disposed thereon a color filter such as a Bayer pattern filter. It has been mentioned that activation of binning module 10 converts a color frame generated with use of a color filter into a monochrome frame, which, though having a lower resolution, features an improved SNR relative to that of an unbinned frame without discarding of image information. Activation of configuration G in Table A can be regarded as activation of a picture taking mode of operation. When operating in a picture taking mode of operation, terminal 1000 in response to activation of trigger signal 502 can capture and can output a color frame of image data. For output of a color frame of image data, terminal 1000 can write a color frame to display 1304 and/or write the frame to non-volatile memory 1084. For output of a color frame, terminal 1000 alternatively or in addition to can transmit the frame via I/O interface 1604, 1608 to an external CPU-based terminal (e.g., a remote server, a local personal computer).

In the example of configuration G, terminal 1000, in response to activation of a trigger signal 502 with configuration G active can capture a limited predetermined number of frames (three in the particular example). CPU 1060 can average the three frames for noise reduction prior to outputting the resulting noise reduced frame as the frame output during operation in a picture taking mode. Decoding processing as described in connection with periods as described in connection with the timing diagram of FIG. 9 can be avoided (indicia decoding module 40 disabled) when terminal 1000 operates in a picture taking mode. Indicia decoding module 40 can also be enabled with configuration G active, and can be enabled with all other configurations of Table A so that a subset of frames captured during an activation period are subject to a decode attempt.

As indicated in Table A, terminal 1000, when a picture taking mode is active, can set a focus setting of variable focus imaging lens 1110 to a longer range focus setting (such that the imaging lens is set to the longer focus setting during the exposure period for each frame) given the expectancy that most pictures taken with the mode active will be taken at long range.

Referring now to configuration H, terminal 1000 with configuration H active, can bin (prior to or after a filter capture) each captured frame captured when trigger signal 502 is active. Thus, each frame captured (capture complete by storage into memory 1085) can be converted from a color frame to a monochrome frame such that it is in a form that is processable with use of a known decoding algorithm adapted for use with a monochrome frame. During the exposure period for each binned frame, imaging lens 1110 can be set to a shorter focus setting so that the likelihood of successfully decoding a decodable indicia by processing a frame captured at short range is increased.

As is indicated by configuration I, the block size of a block of pixel positions subject to binning can be a variable block size. Further, terminal 1000 can be operative so that the binning block size is synchronized with and varies with the lens setting of variable focus imaging lens 1110. In the example of configuration I, terminal 1000 can be capable of 4×4 block binning and can have an "even shorter" focus position relatively shorter than the focus position referred to as "shorter." In such an embodiment, exposure of a 4×4 block frame can be synchronized with the even shorter focus distance setting in the manner of synchronization described herein. Such an adjustment of the focus position can follow the pattern summarized in Table A. Also in accordance with the configuration I, terminal 1000 can be capable of windowing at variable window sizes and can have an "even longer" focus position that is relatively longer than the focus position designated as "longer." Terminal 1000 in the specific window can be capable of capture of a 2952×512 windowed frame corresponding to continuous 2952×512 group of pixels at a center of array 1033 as well as a smaller 1000×200 windowed frame corresponding to continuous 2952×512 group of pixels at a center of array 1033. According to the frame capture and image focus adjustment pattern, terminal 1000 can adjust a frame setting to "even longer" after exposure at a "longer" focus position and can expose a smaller windowed frame when the lens setting is the "even longer" focus setting, the exposure period and lens setting being synchronized in the manner described herein. The variable binning size and variable windowing size shown in configuration I can be implemented as part of a trial and error image capture scheme wherein terminal 1000 captures a plurality of frames for processing according to an open loop operation without detecting a sensed terminal to target distance or any other predetermined criteria. A variable bin size and/or a variable windowing size scheme can also be implemented as part of a detected predetermined criteria scheme as explained in connection with configurations B and C wherein terminal 1000 can activate binning module 10 (configuration B) or windowing module 20 (configuration C) in response to a detected criteria (e.g., a terminal to target distance, a decode time). It was also described with reference to various configurations that a focus setting can be coordinated with activation of binning module 10 and windowing module 20 (e.g., activation of binning module 10 can be synchronized with a setting of imaging lens 1110 at a shorter focus setting, and activation of windowing module 20 can be synchronized with a setting of imaging lens 1110 at a longer focus setting). It will be seen that terminal 1000 can be adapted to vary a bin size responsively to a detected terminal to target distance and to associate a certain bin size for a certain terminal to target distance to a synchronized certain focus setting. Terminal 1000 can also vary a window size responsive to a detected terminal to target distance and to associate a certain window size for a certain terminal to target distance to a synchronized certain focus setting. Also, terminal 1000 can be adapted so that no matter the method for detecting the bin size or window size, the established bin size or window size can be associated with a synchronized certain focus setting. Also, terminal 1000 can be adapted so that without any detecting method for detecting a sensed condition the terminal according to an open loop operation, can establish a bin size or window size to be associated with a synchronized certain focus setting.

Referring now to processes that can be carried out by indicia decoding module 40 during, e.g., periods $d_0$, $d_2$, $d_{n-4}$ of FIG. 9, CPU 1060, appropriately programmed can carry out a decoding process for attempting to decode a frame of image data. For attempting to decode a frame of image data, CPU 1060 can sample image data of a captured frame of image data along a sampling path, e.g., at a center of a frame, or a coordinate location determined to include a decodable indicia representation. In one example, a sampling path selected for executing a decode attempt can be a sampling path which for a previous frame was determined to intersect a decodable indicia representation. Next, CPU 1060 can perform a second derivative edge detection to detect edges. After completing edge detection, CPU 1060 can determine data indicating widths between edges. CPU 1060 can then search for start/stop character element sequences and if found, derive element sequence characters, character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message.

Where a decodable indicia representation is a 2D bar code symbology, a decode attempt can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup. In one example, terminal 1000 can be adapted so that CPU 1060 subjects each frame captured during a time that a trigger signal remains active to a decode attempt (e.g., frame=frame0, frame1, frame2 . . . in any of the configurations described with reference to Table A). In an alternative example, as has been described herein, terminal 1000 can be adapted so that CPU 1060 subjects only a subset of frames to a decode attempt, and selects frames for subjecting to decoding according to a predetermined criteria.

It should be noted that when switching to decoding a new frame (i.e., the switch from frame=frame$_0$ during period d$_0$ to frame=frame$_2$ during period d$_2$) terminal 1000 may not discard the results of decoding the previous frame. For example, in some instances, a decodable indicia subject to decoding can be a bar code of a symbology type that can be decodable to output code words. Code words of a bar code symbol are not complete decoded messages of a bar code symbol but can be combined with other code words of a bar code symbol to provide a complete decoded message. A decoded code word of a bar code symbol may be regarded as a partially decoded message. Symbologies which may be decoded to provide code words representing a partial decoded message of a bar code symbol include PDF 417, UPC, Datamatrix, QR code, and Aztec, etc. Terminal 1000 can be operative to accumulate partially decoded messages determined by processing a set of subject frames until a decoded message for a symbol is determined. For decoding bar code decodable indicia of certain symbologies, CPU 1060 can be adapted to combine partial decoded out results determined from two or more different frames. A partial decode result provided by decoding a frame of image data can take the form of a set of code words. CPU 1060 can be adapted to determine a first set of code words by processing a certain frame of a set of frames while a trigger signal 502 is active and to combine the first set of code words with a second set of code words determined by processing of a subsequent frame while the trigger signal 502 remains active. In one embodiment, CPU 1060 can be adapted so that CPU 1060 can process a certain frame to determine a first set of code words, a subsequent frame to provide a second set of code words, and possibly M further subsequent frames to provide a third set of code words. CPU 1060 can further be adapted to combine the first, second, and possible M additional sets of code words to provide a decoded message. For example, with reference to the timing diagram of FIG. 9, CPU 1060 may process frame=frame$_0$ to determine a first set of code words and then process frame=frame$_2$ to determine a second set of code words and then combine the code words to provide a decoded message output after the expiration of period d$_{n-4}$.

A small sample of systems methods and apparatus that are described herein is as follows:

A1. An indicia reading terminal comprising:

an image sensor integrated circuit having a two dimensional image sensor array, said two dimensional image sensor array including a plurality of pixels, said indicia reading terminal including a binning module for applying a function using image information values representative of light incident at a plurality of pixels of said image sensor array, said indicia reading terminal further including a windowing module for use in selectively addressing a subset of pixels of said image sensor array for read out of a windowed frame;

an imaging lens for use in focusing an image of a target decodable indicia onto said two dimensional image sensor array;

a hand held housing encapsulating said two dimensional image sensor array, said indicia reading terminal being operative for manual activation of a trigger signal by an operator;

wherein said hand held indicia reading terminal is operative so that for a time that said trigger signal remains active, said hand held indicia reading terminal can process a succession of frames, said succession of frames including a binned frame, said succession of frames further including a windowed frame, the windowed frame having image data representing light incident at a group of pixels of said image sensor array, the group of pixels comprising less than 50% of a total number of pixels of said image sensor array, the windowed frame representing indicia within a defined area of a target substrate that is relatively smaller than a defined area within which indicia would be represented by a frame representing light incident on each pixel of said image sensor array;

wherein said hand held indicia reading terminal is operative to process a frame of said succession of frames for attempting to decode for decodable indicia.

A2. The indicia reading terminal of claim A1, wherein said imaging lens is a variable focus imaging lens capable of defining a plurality of best focus distances.

A3. The indicia reading terminal of claim A1, wherein said imaging lens is a variable focus imaging lens capable of defining a plurality of best focus distances, and wherein said indicia reading terminal is operative so that said variable focus imaging lens is moved between a plurality of best focus distance settings ranging between a shorter range and longer range during said time that said trigger signal remains active, said indicia reading terminal being operative so that said variable focus imaging lens is controlled to be in said shorter range best focus distance setting during an exposure period for said binned frame.

A4. The indicia reading terminal of claim A1, wherein said imaging lens is a variable focus imaging lens capable of defining a plurality of best focus distances, and wherein said indicia reading terminal is operative so that said variable focus imaging lens is moved between a plurality of best focus distance settings ranging between a shorter range and a longer range during said time that said trigger signal remains active, said indicia reading terminal being operative so that said variable focus imaging lens is controlled to be in said longer range best focus distance setting during an exposure period for said windowed frame.

A5. The indicia reading terminal of claim A1, wherein said binning module includes an analog binning circuit incorporated in said image sensor integrated circuit for summing charges that have accumulated on a block of said plurality of pixels.

A6. The indicia reading terminal of claim A1, wherein said binning module averages image information values that are associated with a block of pixel positions.

A7. The indicia reading terminal of claim A1, wherein said binning module includes a CPU that sums multibit pixel values that are associated with a block of pixel positions.

A8. The indicia reading terminal of claim A1, wherein said imaging lens is one of a deformable lens or a non-deformable fluid lens.

A9. The indicia reading terminal of claim A1, wherein said indicia reading terminal is operative to capture a full unbinned frame, the full unbinned frame having a certain frame time, where a frame time of said windowed frame is less than said certain frame time.

A10. The indicia reading terminal of claim A1, wherein said indicia reading terminal is operative so that said terminal captures said windowed frame conditionally on satisfaction of a predetermined criteria.

A11. The indicia reading terminal of claim A1, wherein said group of pixels is a continuous group of pixels centered at a center of said image sensor array.

B1. An indicia reading terminal comprising:
an image sensor integrated circuit having a two dimensional image sensor array, said two dimensional image sensor array including a plurality of pixels, said indicia reading terminal including a binning module applying a function using image information values representative of light incident at a plurality of pixels of said image sensor array;
an imaging lens for use in focusing an image of a target decodable indicia onto said two dimensional image sensor array;
a hand held housing encapsulating said two dimensional image sensor array, said indicia reading terminal being operative for manual activation of a trigger signal by an operator;
wherein said hand held indicia reading terminal is operative so that for a time that said trigger signal remains active, said hand held indicia reading terminal can process a succession of frames, said succession of frames including a first binned frame and a second binned frame;
wherein said hand held indicia reading terminal is operative to process a frame of said succession of frames for attempting to decode for decodable indicia; and
wherein said first binned frame has a bin size larger than a bin size of said second binned frame, and wherein said imaging lens is a variable focus imaging lens capable of defining a plurality of best focus distances, and wherein said indicia reading terminal is operative so that said variable focus imaging lens is moved between first and second best focus distance settings during said time that said trigger signal remains active, said first best focus distance being relatively shorter than said second best focus distance, said indicia reading terminal further being operative so that said variable focus imaging lens is controlled to be at said first best focus distance during an exposure period for said first binned frame, said indicia reading terminal further being operative so that said variable focus imaging lens is controlled to be at said second best focus distance during an exposure period for said second binned frame.

B2. The indicia reading terminal of claim B1, wherein said imaging lens is a variable focus imaging lens capable of defining a plurality of best focus distances.

B3. The indicia reading terminal of claim B1, including a color pattern filter disposed over said image sensor array, said indicia reading terminal being operative so that said binning module can be activated to convert color image information to monochrome image information.

B4. The indicia reading terminal of claim B1, wherein said succession of frames that can be processed for said time that said trigger signal remains active includes an unbinned frame.

B5. The indicia reading terminal of claim B1, wherein said succession of frames includes a windowed frame.

B6. The indicia reading terminal of claim B1, wherein said succession of frames includes a first binned frame and a second binned frame, said first binned frame having a bin size larger than a bin size of said second binned frame.

B7. The indicia reading terminal of claim B1, wherein said terminal is operative so that said terminal processes said second binned frame conditionally on satisfaction of a predetermined criteria.

B8. The indicia reading terminal of claim B1, wherein said imaging lens is one of a deformable lens or a non-deformable fluid lens.

C1. An indicia reading terminal comprising:
an image sensor integrated circuit having a two dimensional image sensor array, said two dimensional image sensor array including a plurality of pixels, said indicia reading terminal including a windowing module for use in selectively addressing a subset of pixels of said image sensor array for read out of a windowed frame having image data;
an imaging lens for use in focusing an image of a target decodable indicia onto said image sensor array;
a hand held housing encapsulating said two dimensional image sensor array, said indicia reading terminal being operative for manual activation of a trigger signal by an operator;
wherein said indicia reading terminal is operative for capture of a succession of frames during a time that said trigger signal remains active, wherein said succession of frames includes a first frame and a second windowed frame, said first frame representing light incident on a larger number of pixels of said image sensor array than said second windowed frame, wherein said second windowed frame represents light incident at a group of pixels comprising less than 50% of a total number of pixels of said image sensor array, wherein said imaging lens is a variable focus imaging lens capable of defining a plurality of best focus distances, and wherein said indicia reading terminal is operative so that said variable focus imaging lens is moved between first and second best focus distance settings during said time that said trigger signal remains active, said first best focus distance being relatively shorter than said second best focus distance, said indicia reading terminal further being operative so that said variable focus imaging lens is controlled to be at said first best focus distance during an exposure period for said first frame, said indicia reading terminal further being operative so that said variable focus imaging lens is controlled to be at said second best focus distance during an exposure period for said second windowed frame; and
wherein said hand held indicia reading terminal is operative to process a frame of said succession of frames for attempting to decode for decodable indicia.

C2. The indicia reading terminal of claim C1, wherein said imaging lens is one of a deformable lens or a non-deformable fluid lens.

C3. The indicia reading terminal of claim C1, wherein said first frame is a windowed frame representing light incident at a continuous group of pixels of said image sensor array, where said continuous group of pixels comprises less than 80% of a total number of pixels of said image sensor array.

C4. The indicia reading terminal of claim C1, wherein said terminal is operative so that said terminal captures said second windowed frame conditionally on the satisfaction of a predetermined criteria.

D1. An indicia reading terminal comprising:
an image sensor integrated circuit having a two dimensional image sensor array, said two dimensional image sensor array including a plurality of pixels and a color pattern filter disposed over said two dimensional image sensor array, said indicia reading terminal including a binning module for summing signal values representative of light incident at a block of said plurality of pixels of said image sensor array;
an imaging lens for use in focusing an image of a target decodable indicia onto said image sensor array;
a hand held housing encapsulating said two dimensional image sensor array, said indicia reading terminal being operative for manual activation of a trigger signal by an operator;
wherein said hand held indicia reading terminal is operative in a picture taking mode and an indicia decoding mode, said indicia reading terminal further being operative so that when said terminal is operated for capture of a succession of frames with said picture taking mode active said binning module is not enabled so that said succession of frames captured with said picture taking mode active include color image data, said indicia reading terminal further being operative so that when said terminal is operated to process a succession of the frames with said indicia decoding mode active said binning module is enabled so that said succession of frames processed with said indicia decoding mode active includes a binned frame including monochrome image data for subjecting to an indicia decode attempt.

D2. The indicia reading terminal of claim D1, wherein said imaging lens is one of a deformable lens or a non-deformable fluid lens.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

The invention claimed is:

1. An indicia reading terminal comprising:
an image sensor integrated circuit having a two dimensional image sensor array, said two dimensional image sensor array including a plurality of pixels, said indicia reading terminal including a binning module for applying a function using image information values representative of light incident at a plurality of pixels of said image sensor array, said indicia reading terminal further including a windowing module for use in selectively addressing a subset of pixels of said image sensor array for read out of a windowed frame;
an imaging lens for use in focusing an image of a target decodable indicia onto said two dimensional image sensor array;
a hand held housing encapsulating said two dimensional image sensor array, said indicia reading terminal being operative for manual activation of a trigger signal by an operator;
wherein said hand held indicia reading terminal is operative so that for a time that said trigger signal remains active, said hand held indicia reading terminal can process a succession of frames, said succession of frames including a binned frame, said succession of frames further including a windowed frame, the windowed frame having image data representing light incident at a group of pixels of said image sensor array, the group of pixels comprising less than 50% of a total number of pixels of said image sensor array, the windowed frame representing indicia within a defined area of a target substrate that is relatively smaller than a defined area within which indicia would be represented by a frame representing light incident on each pixel of said image sensor array;
wherein said hand held indicia reading terminal is operative to process a frame of said succession of frames for attempting to decode for decodable indicia.

2. The indicia reading terminal of claim 1, wherein said imaging lens is a variable focus imaging lens operative to define a plurality of best focus distances.

3. The indicia reading terminal of claim 1, wherein said imaging lens is a variable focus imaging lens operative to define a plurality of best focus distances, and wherein said indicia reading terminal is operative so that said variable focus imaging lens is moved between a plurality of best focus distance settings ranging between a shorter range best focus distance and a longer range best focus distance during said time that said trigger signal remains active, said indicia reading terminal being operative so that said variable focus imaging lens is controlled to be in said shorter range best focus distance setting during an exposure period for said binned frame.

4. The indicia reading terminal of claim 1, wherein said imaging lens is a variable focus imaging lens capable of defining a plurality of best focus distances, and wherein said indicia reading terminal is operative so that said variable focus imaging lens is moved between a plurality of best focus distance settings ranging between a shorter range best focus distance and a longer range best focus distance during said time that said trigger signal remains active, said indicia reading terminal being operative so that said variable focus imaging lens is controlled to be in said longer range best focus distance setting during an exposure period for said windowed frame.

5. The indicia reading terminal of claim 1, wherein said binning module includes an analog binning circuit incorporated in said image sensor integrated circuit for summing charges that have accumulated on a block of said plurality of pixels.

6. The indicia reading terminal of claim 1, wherein said binning module averages image information values that are associated with a block of pixel positions.

7. The indicia reading terminal of claim 1, wherein said binning module includes a CPU that sums multibit pixel values that are associated with a block of pixel positions.

8. The indicia reading terminal of claim 1, wherein said imaging lens is one of a deformable lens or a non-deformable fluid lens.

9. The indicia reading terminal of claim 1, wherein said indicia reading terminal is operative to capture a full unbinned frame, the full unbinned frame having a certain frame time, where a frame time of said windowed frame is less than said certain frame time.

10. The indicia reading terminal of claim 1, wherein said indicia reading terminal is operative so that said terminal captures said windowed frame conditionally on satisfaction of a predetermined criteria.

11. The indicia reading terminal of claim 1, wherein said group of pixels is a continuous group of pixels centered at a center of said image sensor array.

12. An indicia reading terminal comprising:
an image sensor integrated circuit having a two dimensional image sensor array, said two dimensional image sensor array including a plurality of pixels, said indicia reading terminal including a binning module applying a function using image information values representative of light incident at a plurality of pixels of said image sensor array;

an imaging lens for use in focusing an image of a target decodable indicia onto said two dimensional image sensor array;

a hand held housing encapsulating said two dimensional image sensor array, said indicia reading terminal being operative for manual activation of a trigger signal by an operator;

wherein said hand held indicia reading terminal is operative so that for a time that said trigger signal remains active, said hand held indicia reading terminal can process a succession of frames, said succession of frames including a first binned frame and a second binned frame;

wherein said hand held indicia reading terminal is operative to process a frame of said succession of frames for attempting to decode for decodable indicia; and wherein said first binned frame has a bin size larger than a bin size of said second binned frame, and wherein said imaging lens is a variable focus imaging lens capable of defining a plurality of best focus distances, and wherein said indicia reading terminal is operative so that said variable focus imaging lens is moved between first and second best focus distance settings during said time that said trigger signal remains active, said first best focus distance being relatively shorter than said second best focus distance, said indicia reading terminal further being operative so that said variable focus imaging lens is controlled to be at said first best focus distance during an exposure period for said first binned frame, said indicia reading terminal further being operative so that said variable focus imaging lens is controlled to be at said second best focus distance during an exposure period for said second binned frame.

13. The indicia reading terminal of claim 12, wherein said imaging lens is a variable focus imaging lens capable of defining a plurality of best focus distances.

14. The indicia reading terminal of claim 12, including a color pattern filter disposed over said image sensor array, said indicia reading terminal being operative so that said binning module can be activated to convert color image information to monochrome image information.

15. The indicia reading terminal of claim 12, wherein said succession of frames that can be processed for said time that said trigger signal remains active includes an unbinned frame.

16. The indicia reading terminal of claim 12, wherein said succession of frames includes a windowed frame.

17. The indicia reading terminal of claim 12, wherein said succession of frames includes a first binned frame and a second binned frame, said first binned frame having a bin size larger than a bin size of said second binned frame.

18. The indicia reading terminal of claim 12, wherein said terminal is operative so that said terminal processes said second binned frame conditionally on satisfaction of a predetermined criteria.

19. The indicia reading terminal of claim 12, wherein said imaging lens is one of a deformable lens or a non-deformable fluid lens.

20. An indicia reading terminal comprising:
an image sensor integrated circuit having a two dimensional image sensor array, said two dimensional image sensor array including a plurality of pixels, said indicia reading terminal including a windowing module for use in selectively addressing a subset of pixels of said image sensor array for read out of a windowed frame having image data;

an imaging lens for use in focusing an image of a target decodable indicia onto said image sensor array;

a hand held housing encapsulating said two dimensional image sensor array, said indicia reading terminal being operative for manual activation of a trigger signal by an operator;

wherein said indicia reading terminal is operative for capture of a succession of frames during a time that said trigger signal remains active, wherein said succession of frames includes a first frame and a second windowed frame, said first frame representing light incident on a larger number of pixels of said image sensor array than said second windowed frame, wherein said second windowed frame represents light incident at a group of pixels comprising less than 50% of a total number of pixels of said image sensor array, wherein said imaging lens is a variable focus imaging lens capable of defining a plurality of best focus distances, and wherein said indicia reading terminal is operative so that said variable focus imaging lens is moved between first and second best focus distance settings during said time that said trigger signal remains active, said first best focus distance being relatively shorter than said second best focus distance, said indicia reading terminal further being operative so that said variable focus imaging lens is controlled to be at said first best focus distance during an exposure period for said first frame, said indicia reading terminal further being operative so that said variable focus imaging lens is controlled to be at said second best focus distance during an exposure period for said second windowed frame; and wherein said hand held indicia reading terminal is operative to process a frame of said succession of frames for attempting to decode for decodable indicia.

21. The indicia reading terminal of claim 20, wherein said imaging lens is one of a deformable lens or a non-deformable fluid lens.

22. The indicia reading terminal of claim 20, wherein said first frame is a windowed frame representing light incident at a continuous group of pixels of said image sensor array, where said continuous group of pixels comprises less than 80% of a total number of pixels of said image sensor array.

23. The indicia reading terminal of claim 20, wherein said terminal is operative so that said terminal captures said second windowed frame conditionally on the satisfaction of a predetermined criteria.

24. An indicia reading terminal comprising:
an image sensor integrated circuit having a two dimensional image sensor array, said two dimensional image sensor array including a plurality of pixels and a color pattern filter disposed over said two dimensional image sensor array, said indicia reading terminal including a binning module for summing signal values representative of light incident at a block of said plurality of pixels of said image sensor array;

an imaging lens for use in focusing an image of a target decodable indicia onto said image sensor array;

a hand held housing encapsulating said two dimensional image sensor array, said indicia reading terminal being operative for manual activation of a trigger signal by an operator;

wherein said hand held indicia reading terminal is operative in a picture taking mode and an indicia decoding mode, said indicia reading terminal further being operative so that when said terminal is operated for capture of a succession of frames with said picture taking mode active said binning module is not enabled so that said succession of frames captured with said picture taking mode active include color image data, said indicia reading terminal further being operative so that when said terminal is operated to process a succession of the frames with said indicia decoding mode active said binning module is enabled so that said succession of frames processed with said indicia decoding mode active includes a binned frame including monochrome image data for subjecting to an indicia decode attempt.

25. The indicia reading terminal of claim 24, wherein said imaging lens is one of a deformable lens or a non-deformable fluid lens.

* * * * *